United States Patent [19]
Tolman et al.

[11] Patent Number: 5,828,528
[45] Date of Patent: Oct. 27, 1998

[54] MR SENSORS WITH SELECTED RESISTANCES FOR THE SENSING AND BIASING LAYERS TO ENHANCE READING CAPABILITIES

[75] Inventors: Charles H. Tolman, Bloomington, Minn.; Lin Zhou, Shrewsbury, Mass.

[73] Assignee: Seagate Technology, Inc., Scotts Valley, Calif.

[21] Appl. No.: 853,262

[22] Filed: May 9, 1997

Related U.S. Application Data

[60] Provisional application No. 60/025,403 Sep. 6, 1996.
[51] Int. Cl.⁶ .................................................. G11B 5/39
[52] U.S. Cl. ................................................. 360/113
[58] Field of Search ............................................. 360/113

[56] References Cited

U.S. PATENT DOCUMENTS

| | | | |
|---|---|---|---|
| 4,470,873 | 9/1984 | Nakamura ........................... | 156/640 |
| 4,785,366 | 11/1988 | Krounbi et al. ........................ | 360/113 |
| 4,879,619 | 11/1989 | Fontana, Jr. et al. .................. | 360/113 |
| 5,079,035 | 1/1992 | Krounbi et al. ........................ | 427/130 |
| 5,260,652 | 11/1993 | Collver et al. ......................... | 324/252 |
| 5,262,914 | 11/1993 | Chen et al. ............................ | 360/113 |
| 5,458,908 | 10/1995 | Krounbi et al. ........................ | 427/123 |
| 5,495,378 | 2/1996 | Bonyhard et al. ...................... | 360/113 |
| 5,554,265 | 9/1996 | Bonyhard et al. .................. | 204/192.35 |

*Primary Examiner*—H. J. Heinz
*Attorney, Agent, or Firm*—Kinney & Lange, P.A.

[57] ABSTRACT

A magnetoresistive sensor for detecting stored information from a magnetic medium and for providing an output voltage to auxiliary circuitry is disclosed. The magnetoresistive sensor includes a magnetoresistive magnetic layer formed from a magnetic material, the magnetic layer having a magnetization, a resistivity and a thickness. A resistance of the magnetic layer equals the resistivity of the layer divided by the thickness of the layer. The magnetic sensor also comprises a bias layer having a resistivity, a thickness and a saturation inductance. A resistance of the bias layer equals the resistivity of the layer divided by the thickness of the layer. The resistance of the bias layer is in parallel with the resistance of the magnetic layer. The saturation inductance of the bias layer helps to bias the magnetic layer from a rest position to a magnetized position. A spacer layer is positioned between the magnetic layer and the bias layer. The spacer layer has a resistivity and a thickness. A resistance of the spacer layer equals the resistivity of the layer divided by the thickness of the layer. The resistance of the spacer layer is in parallel with both the resistances of the magnetic layer and the bias layer. The parallel resistances of the bias layer and the spacer layer is at least twice as large as the resistance of the magnetic layer such that at least two-thirds of the current flows through the magnetic layer and at most one-third of the current flows through the combination of the bias layer and the spacer layer.

18 Claims, 5 Drawing Sheets

| LAYER | THICKNESS (Å) | RESISTIVITY (μΩ-cm) | R (Ω/SQ.) | PARALLEL RESISTANCE R_SPACES R_SAT (Ω/SQ) | | I_MR | OUTPUT SIGNAL V/V₀ |
|---|---|---|---|---|---|---|---|
| MR MAGNETIC LAYER 52 (NiFe) | 200 | 30 | 15 | | 71% | 82% | |
| SPACER LAYER 54 (Ta) | 150 | 200 | 133 | | 8% | 9.4% | |
| SAL 56 (NiFeRe) | 200 | 100 | 50 | 36.3 | 21% | | 50% |
| SAL 56 (SENDUST) | 130 | 190 | 146 | 69.6 | | 8.6% | 68% |

Fig. 7

MR SENSORS WITH SELECTED RESISTANCES FOR THE SENSING AND BIASING LAYERS TO ENHANCE READING CAPABILITIES

This application claims the priority benefit of a provisional U.S. patent application having application Ser. No. 60/025,403, filed on Sep. 6, 1996.

BACKGROUND OF THE INVENTION

The present invention is an improved magnetoresistive sensor for use in a magnetoresistive read device. In particular, the present invention is a magnetoresistive sensor having an improved bias layer such that the sensor is efficient in terms of output voltage for a given applied sense current.

Magnetoresistive (MR) sensors or heads are used to read magnetically encoded information from a magnetic medium by detecting magnetic flux stored in the magnetic medium. During the operation of an MR sensor, a sense current is passed through the MR element of the sensor, causing a voltage drop across the MR element. The magnitude of the voltage drop is a function of the resistance of the MR element. The resistance of the MR element varies in the presence of a magnetic field. Therefore, as the magnitude of the flux from a medium transition passing through the MR element varies, the voltage drop across the MR element also varies. Differences in the magnitude of the magnetic flux from the medium entering the MR sensor can be detected by monitoring the voltage across the MR element.

An MR sensor will provide an approximately linear output when the magnetization vector M of the MR element and the current density vector J of the MR element form an angle of approximately 45 degrees. Permalloy, a typically MR element material and an alloy of nickel and iron (approximately 81% nickel and 19% iron) will naturally tend to form a magnetization vector along its long axis when it is formed into a long narrow strip. This alignment is enhanced by a magnetic field induced anisotropy formed during the deposition of the permalloy element. The current density vector J is also typically directed along the same axis. By forming a soft adjacent layer (SAL) or bias layer near the MR element and in a parallel plane to the plane of the MR element, the magnetization vector can be rotated up to 90 degrees with respect to the long axis. The amount of saturation inductance $B_S$ of the SAL or bias layer directly effects this angle. Once again, it is desirous for this bias angle to be approximately 45 degrees, for purposes of near-linear response of the sensor.

MR sensors of the SAL or bias layer design have three important layers. First, a magnetic layer with MR properties which generates an output voltage when its magnetization is rotated and a sense current flows through the layer. Second, a SAL or magnetic bias layer, with essentially no magnetoresistive properties or response. The SAL biases the MR magnetic layer from a rest position to a magnetized position. Due to the fields generated by the sense current in the various layers, and the magnetostatic coupling with the MR layer, magnetization in the SAL or bias layer is usually saturated along its hard magnetization direction. Third, a non-magnetic spacer layer is positioned between the two above described magnetic layers. The spacer layer breaks the ferromagnetic exchange coupling between the MR magnetic layer and the SAL allowing the magnetic layers to act as two distinct layers, rather than as one strongly coupled layer.

In order for an MR sensor to properly read information from a magnetic storage medium, several factors are important. First, as described above, the MR magnetic layer must be biased such that the magnetization vector M and the current density vector J form an angle of approximately 45 degrees. Second, it is critical to have as much of the sense current flowing through the MR magnetic layer of the sensor as possible. Third, a bias layer and/or a spacer layer with increased resistance will cause a reduced amount of shunting of the output voltage generated by the MR magnetic layer. Thus, it is important that the resistance of the SAL and the resistance of the spacer layer are significantly larger than the resistance of the MR magnetic layer. These three resistances are in parallel with one another, since these three layers are positioned side-by-side, or in a three layer stack. Maximizing the resistances of the SAL and the spacer layer will reduce their undesirable shunting effects, and thereby will generate an increase in the output voltage signal of the MR sensor.

It is, therefore, one object of the present invention to provide an MR sensor which includes a properly biased MR magnetic layer, i.e., the magnetization vector M and the current density vector J form an angle of approximately 45 degrees. It is another object of the invention to provide an MR sensor which maximizes the amount of sense current which flows through the MR magnetic layer of the MR sensor and which has less shunting of its output voltage by the layers in the sensor "stack," thereby maximizing the output voltage signal of the MR sensor.

SUMMARY OF THE INVENTION

The present invention is an improved magnetoresistive (MR) sensor for detecting stored information from a magnetic medium, such as a magnetic disc. The MR sensor of the present invention includes three distinct layers. First, a magnetoresistive (MR) magnetic layer is formed from a magnetic material, the MR magnetic layer having a magnetization, a resistivity and a thickness. A resistance of the MR magnetic layer equals the resistivity of the layer divided by the thickness of the layer. Second, a SAL or bias layer is formed having a resistivity, a thickness and a saturation inductance. A resistance of the SAL equals the resistivity of the layer divided by the thickness of the layer. The resistance of the SAL is in parallel with the resistance of the MR magnetic layer. The saturation inductance of the SAL helps to bias the MR magnetic layer from a rest position to a magnetized position. Third, a spacer layer is positioned between the MR magnetic layer and the bias layer. The spacer layer has a resistivity and a thickness. A resistance of the spacer layer equals the resistivity of the layer divided by the thickness of the layer. The resistance of the spacer layer is in parallel with both the resistance of the MR magnetic layer and the SAL. In accordance with the present invention, the parallel resistances of the bias layer and the spacer layer is at least twice as large as the resistance of the MR magnetic layer. Thus, at least two-thirds of the sense current flows through the MR magnetic layer and at most one-third of the sense current flows through the combination of the bias layer and the spacer layer. Also, the output signal from the MR magnetic layer will be attenuated by, at most, approximately one-third. The present design provides that a majority of the sense current will flow through the MR magnetic layer and thereby maximize the output voltage in addition to having less shunting of the output signal. This output voltage is manipulated in order to retrieve the information from the storage medium.

In one preferred embodiment, the resistivity of the MR magnetic layer is at most 100 micro-ohm centimeters, while the resistivity of the spacer layer is at least 100 micro-ohm centimeters and the resistivity of the SAL is at least 100 micro-ohm centimeters. In another preferred embodiment, each of the MR magnetic layer and spacer layer has a thickness in the range of 25 to 400 angstroms, while the SAL has a thickness in the range of 25 to 1,000 angstroms.

The present invention provides for a magnetic sensor which has a properly biased MR magnetic layer due to the magnetic and resistive properties of a SAL. The present sensor also provides for a high resistivity in the SAL and the spacer layer, thereby maximizing the amount of sense current which flows through the MR magnetic layer of the MR sensor, and also reducing the output voltage shunting, which in turn maximizes the output voltage of the sensor. Thus, the MR sensor can optimally read information from the magnetic medium.

BRIEF DESCRIPTION OF THE DRAWINGS

FIG. 7 is a table showing various properties for the three layers of the MR sensor.

DETAILED DESCRIPTION OF THE PREFERRED EMBODIMENTS

Figure 1:
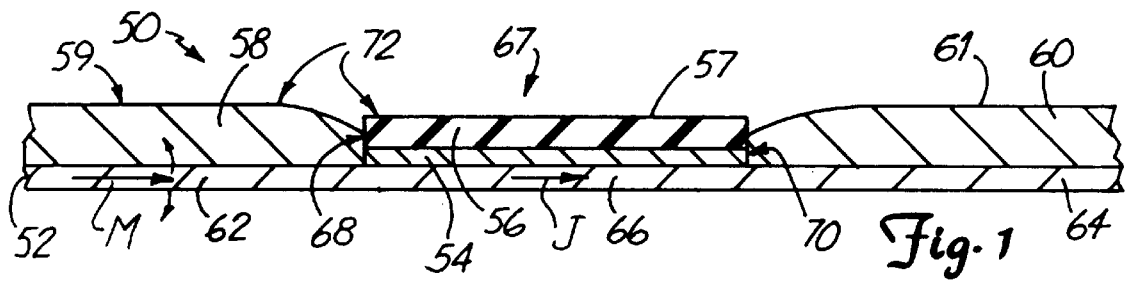
FIG. 1 is a sectional view of a magnetoresistive (MR) sensor configured in accordance with the present invention.

FIG. 1 is a sectional view of magnetoresistive (MR) sensor 50. The sectional view shown in FIG. 1 is taken from a plane parallel to the air bearing surface of the sensor. In other words, the air bearing surface of MR sensor 50 is parallel to the plane of the page. MR sensor 50 includes MR magnetic layer 52, spacer layer 54, soft adjacent layer (SAL) 56, and first and second permanent magnets or permanent magnet layer regions 58 and 60. SAL 56 is also known as a bias layer. While FIG. 1 depicts MR sensor 50 having SAL 56 positioned on top of spacer layer 54, which in turn is positioned on top of MR magnetic layer 52, it is understood that SAL 56 and MR magnetic layer 52 can be interchanged without varying from the present invention. This feature has been omitted from the drawings for clarity.

MR magnetic layer 52 includes first outer region 62, second outer region 64, and active or central region 66 which is positioned between outer regions 62 and 64. Permanent magnet region 58 has a first surface 59 and is positioned at least partially on top of first MR element outer region 62. Permanent magnet region 60 has a first surface 61 and is positioned at least partially on top of second MR element outer region 64. Gap region 67 is formed above MR element active region 66 and between permanent magnet regions 58 and 60.

Spacer layer 54 is positioned between permanent magnet regions 58 and 60 and on top of active region 66 of MR magnetic layer 52. SAL 56 is positioned on top of spacer layer 54 such that SAL 56 is also at least partially located between permanent magnet regions 58 and 60. An active region 67 of MR sensor 50 includes active region 66 of MR magnetic layer 52, spacer layer 54, and at least portions of SAL 56. In preferred embodiments, SAL 56 has a first surface 57 which is substantially coplanar with surfaces 59 and 61 of first and second permanent magnet regions 58 and 60. Permanent magnet regions 58 and 60 act as boundaries of active region 67 and make contact with spacer layer 54 and SAL 56 at junctions 68 and 70. Permanent magnet regions 58 and 60 also help to define active region 66 of MR magnetic layer 52.

MR magnetic layer 52 is, in preferred embodiments, a layer of permalloy. Permalloy is a name commonly used to identify any of a large number of highly magnetically permeable alloys containing a combination of nickel (Ni) and iron (Fe). It must be noted that other magnetoresistive materials can be used instead of permalloy. In preferred embodiments, the resistivity of MR magnetic layer 52 is less than 100 $\mu\Omega$-cm. MR magnetic layer 52 preferably has a thickness of between 25 and 400 angstroms (Å).

First and second permanent magnet regions 58 and 60 are preferably formed from a layer of high coercivity cobalt-platinum (CoPt). However, other ferromagnetic materials can be used instead of CoPt. The resistivity of permanent magnet regions 58 and 60 is preferably between 30 and 60 $\mu\Omega$-cm. In preferred embodiments, the thickness of permanent magnet regions 58 and 60 is between 200 and 1000 angstroms (Å).

Spacer layer 54 is a non-magnetic layer of high resistivity material which is positioned between SAL 56 and active region 66 of MR magnetic layer 52 to prevent magnetic exchange coupling between these two layers. The resistivity of spacer layer 54 is preferably substantially higher than that of MR magnetic layer 52 so that it shunts only a small amount of current away from active region 66 of MR magnetic layer 52, and also reduces the amount of shunting of the output voltage signal from MR magnetic layer 52. In preferred embodiments, spacer layer 54 is a layer of tantalum (Ta) having a resistivity of at least 100 $\mu\Omega$-cm and a thickness of between 25 and 400 angstroms (Å).

SAL 56 is preferably a layer of Sendust-type alloy which is made up of approximately 70 to 90% iron (Fe), up to 15% silicon (Si) and up to 15% aluminum (Al). Sendust-type alloys can also contain small amounts of additional elements, in dilute form, such as up to 5% of titanium (Ti), chromium (Cr), vanadium (V), manganese (Mn), and/or zirconium (Zr), to name a few. The Sendust-type alloy forming SAL 56 can be formed in a variety of sputtering gases such as argon, neon, krypton, xenon and helium. SAL 56 can also be a layer of various ferromagnetic materials, for example nickel-iron-rhodium (NiFeRh), nickel-iron-rhenium (NiFeRe), or nickel-iron-chromium (NiFeCr). The resistivity of SAL 56 is preferably at least 100 $\mu\Omega$-cm to reduce the shunting effects. SAL 56 has a preferred thickness of between 25 and 1000 angstroms and a preferred saturation inductance of at least 3 Kilo-Gauss to properly bias MR magnetic layer 52.

First outer region 62 of MR magnetic layer 52 is inhibited from magnetic rotation by first high coercivity, low permeability permanent magnet region 58 through exchange coupling between layers. Second outer region 64 of MR magnetic layer 52 is inhibited from magnetic rotation by second permanent magnet region 60. Therefore, very little magnetic flux from a transition on a disc is absorbed into outer regions 62 and 64. This in turn helps to provide a well-defined reader track width. There is no permanent magnet region above active region 66 of MR magnetic layer 52, therefore, that region is not inhibited from magnetic rotation.

Figure 2:
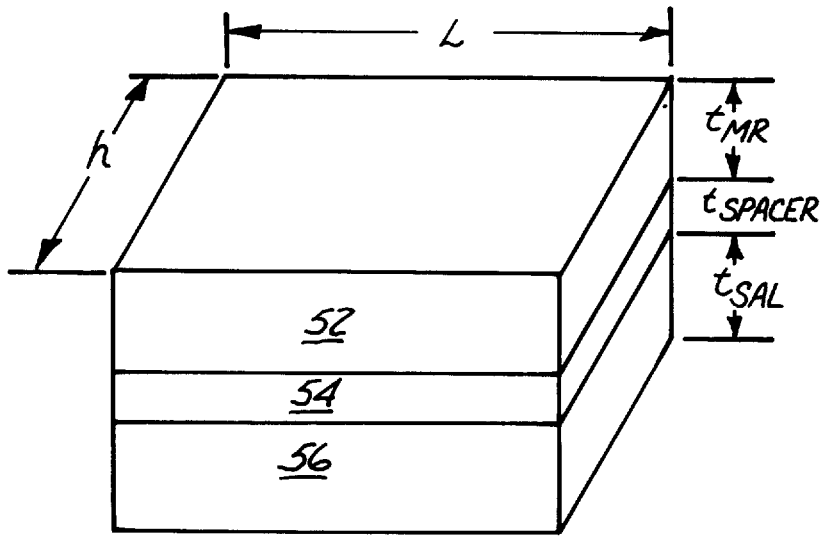
FIG. 2 is a layered diagram of the MR sensor in accordance with the present invention.
Figure 3:
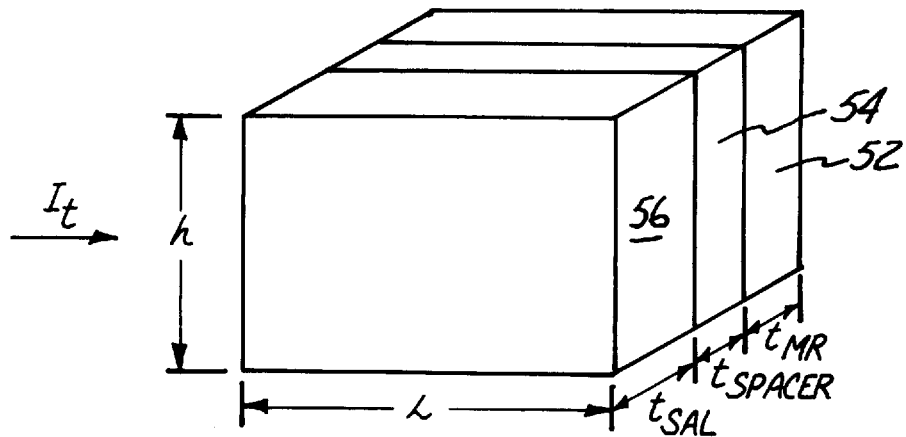
FIG. 3 is a layered diagram of the MR sensor shown in FIG. 2 rotated 90 degrees.
Figure 4:
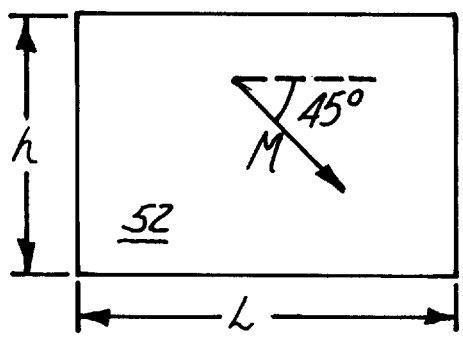
FIG. 4 is a side view of the MR magnetic layer of the MR sensor shown in FIG. 3 in accordance with the present invention.
Figure 5:
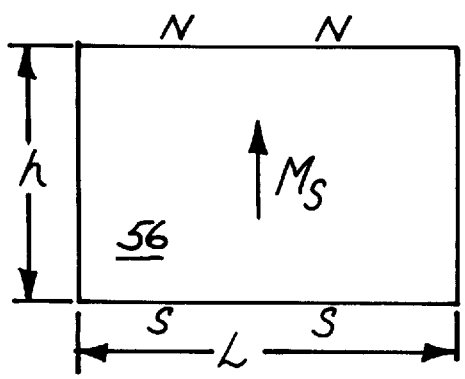
FIG. 5 is a side view of the SAL of the MR sensor shown in FIG. 3 in accordance with the present invention.

FIG. 2 is a layered diagram of MR sensor 50 in accordance with the present invention, while FIG. 3 is a layered diagram of MR sensor 50 shown in FIG. 2 rotated 90 degrees. FIGS. 2 and 3 show only the active region of MR sensor 50. FIG. 4 is a side view of MR magnetic layer 52 of MR sensor 50 shown in FIG. 3, while FIG. 5 is a side view of SAL 56 of MR sensor 50 shown in FIG. 3. As shown in FIGS. 2 and 3, MR magnetic layer 52, spacer layer 54 and SAL 56 each have a given length, height and thickness.

MR magnetic layer 52 will naturally tend to align its magnetization vector M along its long axis when it is formed. For purposes of explanation, it will be assumed that natural magnetization vector M of active region 66 in MR magnetic layer 52 points in the direction as shown in FIG. 1 and the non-rotated direction in FIG. 4. Current density vector J is formed in MR magnetic layer 52 as current passes through MR sensor 50 during its operation. It is assumed that current flows through MR sensor 50, and thus through MR magnetic layer 52 in the direction as viewed in FIG. 1. Therefore, current density vector J in active region 66 points in the same direction as natural magnetization vector M in this example.

The resistance of MR magnetic layer 52 will vary nearly linearly with the magnitude of magnetic flux from the storage medium entering MR magnetic layer 52 when magnetization vector M and current density vector J form an angle of approximately 45 degrees. Thus, to achieve a nearly linear response from MR sensor 50, natural magnetization vector M of MR magnetic layer 52 is rotated by forming SAL 56 above active region 66. The magnetic field from SAL 56, and the current flowing in spacer layer 54 and SAL 56, and the magnetostatic coupling between active region 66 and SAL 56 (shown in FIG. 5) cause natural magnetization vector M of MR magnetic layer 52 to rotate, as illustrated in FIG. 4.

In order for SAL 56 to help to properly bias MR magnetic layer 52 from a rest position (where the angle between magnetization vector M of MR magnetic layer 52 and current density vector J of MR magnetic layer 52 is 0 degrees) to a magnetized position (where the angle between magnetization vector M and current density vector J is approximately 45 degrees), the flux level of layer 56 should be between 0.50 to 0.75 of the flux level of MR layer 52. Within this range, SAL 56 will help to properly bias MR magnetic layer 52 such that the angle between magnetization vector M and current density vector J of MR magnetic layer 52 is approximately 45 degrees. The flux level from a given layer is the product of its saturation induction $B_S$ times its thickness and times its active sensor length. The flux will need to vary in this range depending on the magnetic and dimensional properties of MR magnetic layer 52 and SAL 56. If the flux is not within this range, MR magnetic layer 52 will not be properly biased. In other words, the angle between magnetization vector M and current density vector J of MR magnetic layer 52 could be up to 90 degrees or could be as little as 0 degrees. With these values, magnetic sensor 52 will not properly read information stored on the magnetic storage medium.

Figure 6:
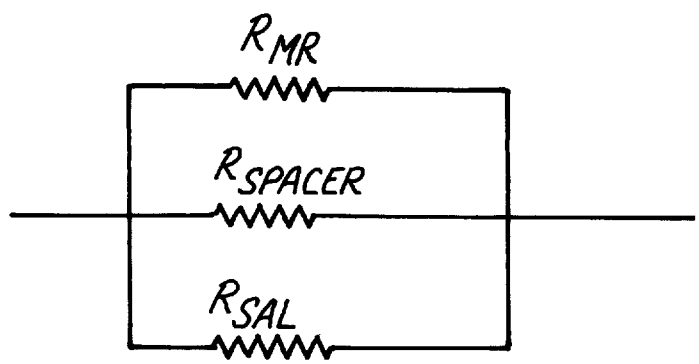
FIG. 6 is an electrical representation of the MR sensor shown in FIG. 3 in accordance with the present invention.

Examples of various materials and dimensions which can be utilized to build MR sensor 50 will now be further described. In order for MR sensor 50 to properly and accurately read information from the magnetic storage medium, it is critical to maximize the amount of sense current flowing through MR magnetic layer 52 (within limits) and minimize the amount of sense current flowing through spacer layer 54 and SAL 56. FIG. 6 is an electrical representation of MR sensor 50 in accordance with the present invention. As shown in FIG. 6, the resistances of MR magnetic layer 52, spacer layer 54 and SAL 56 are all in parallel with one another. Thus, in order to maximize the amount of sense current flowing through MR magnetic layer 52, the resistance of spacer layer 54 and SAL 56 should be maximized.

There are several methods of maximizing the resistance of the SAL bias layer 56 of MR sensor 50. One method is to determine the resistive shunting effect of SAL 56 by determining the product of that layer's saturation inductance $B_S$ times the resistivity $\rho$ of the layer. This method begins with the following equation:

$$R_{SAL} = (\rho L/ht)_{SAL}$$

where $\rho$ is the resistivity, L is the length, h is the height and t is the thickness of the material.

The magnetic flux of SAL 56 is approximately equal to 0.60 to 0.75 of the magnetic flux MR magnetic layer 52, for proper biasing of MR magnetic layer 52. The magnetic flux of SAL 56 is equal to its saturation inductance $B_S$ times the length of SAL 56 times the thickness of SAL 56. Thus, the magnetic flux of SAL 56 is equal to 0.60 to 0.75 times the saturation inductance of MR magnetic layer 52 times the length of MR magnetic layer 52 times the thickness of MR magnetic layer 52. Using a valve of 0.65 for the ratio, the following equation applies:

$$(B_S \times L \times t)_{SAL} = 0.65 (B_S \times L \times t)_{MR}$$

Since the length of SAL 56 is equal to the length of MR magnetic layer 52, we can solve for the thickness of SAL 56 through use of the following equation:

$$t_{SAL} = 0.65 (B_S \times t)_{MR} / (B_S)_{SAL}$$

The resistance of SAL 56 can then be determined by substituting $t_{SAL}$ into the previous equation for $R_{SAL}$:

$$R_{SAL} = (\rho L/h)_{SAL} \times (B_S)_{SAL} / (0.65 B_S \times t)_{MR}$$

Thus, $$R_{SAL} = C \times (B_S \times \rho)_{SAL}$$

for a given design, where C is a constant for a given design. Thus, in order to maximize the resistance of SAL 56, it is critical to maximize the product of the saturation inductance $B_S$ and the resistivity $\rho$ of SAL 56.

If a ferromagnetic material such as nickel-iron-rhenium (NiFeRe) is used for SAL 56, the saturation inductance $B_S$ is approximately 6,000 Gauss and the resistivity $\rho$ is approximately 100 micro ohm-centimeters. Thus, the product of these figures is 600 Kilo-Gauss×micro ohm-centimeters (KG×$\mu\Omega$-cm). This figure of merit is somewhat low. However, by forming SAL 56 from a Sendust-type alloy (70 to 90% Fe, up to 15% Si, up to 15% Al), the saturation inductance $B_S$ increases to approximately 10,500 Gauss and the resistivity $\rho$ increases to approximately 180 to 190 micro ohm-centimeters. The product of these two figures is approximately 1,900 Kilo-Gauss×micro ohm-centimeters (KG×μΩ-cm). Thus, by using a SAL made from a Sendust-type alloy, the figure of merit of the saturation inductance $B_S$ times the resistivity $\rho$ of the layer is more than tripled. The resistance of SAL 56 has, therefore, more than tripled.

A second method for maximizing the resistive shunting effect of SAL 56 is by manipulating the thickness and the resistivity of SAL 56. A resistance of a given layer is equal to the resistivity of that layer divided by the thickness of that layer. FIG. 7 is a table showing various properties for the three layers of magnetic sensor 50. It will be noticed that two different sets of data have been shown for SAL 56.

As shown in FIG. 7, SAL 56 formed from a Sendust-type alloy has a much greater resistance (14 Ω/SQ) then SAL 56 formed from nickel-iron-rhenium (50 Ω/SQ). Thus, the parallel resistance of spacer 54 and SAL 56 increases from 36.3 Ω/SQ to 69.6 Ω/SQ by utilizing Sendust rather than nickel-iron-rhenium for SAL 56.

The current which flows through MR magnetic layer 52, as shown in FIG. 7, greatly increases from 71% of the total current to 82% of the total current. Likewise, the amount of available signal which could be read by MR magnetic layer 52 dramatic increases from 50% of available signal to 68% of available signal, due to the increased MR current and reduced output voltage shunting, for the same total sense current. By dividing 68% by 50%, a factor of 1.36 is achieved. Thus, the voltage signal coming out of MR sensor 50 which includes SAL 56 made up of a Sendust-type alloy is 36% greater than that of the magnetic sensor having SAL 56 made up of nickel-iron-rhenium.

To illustrate the above improvements, assume that between 10–12 milliamps of current flows through MR sensor 50. If MR sensor 50 would get 600 microvolts output current using SAL 56 formed of nickel-iron-rhenium, MR sensor 50 would then get approximately 815 microvolts output current using SAL 56 formed of Sendust.

Figure 8:
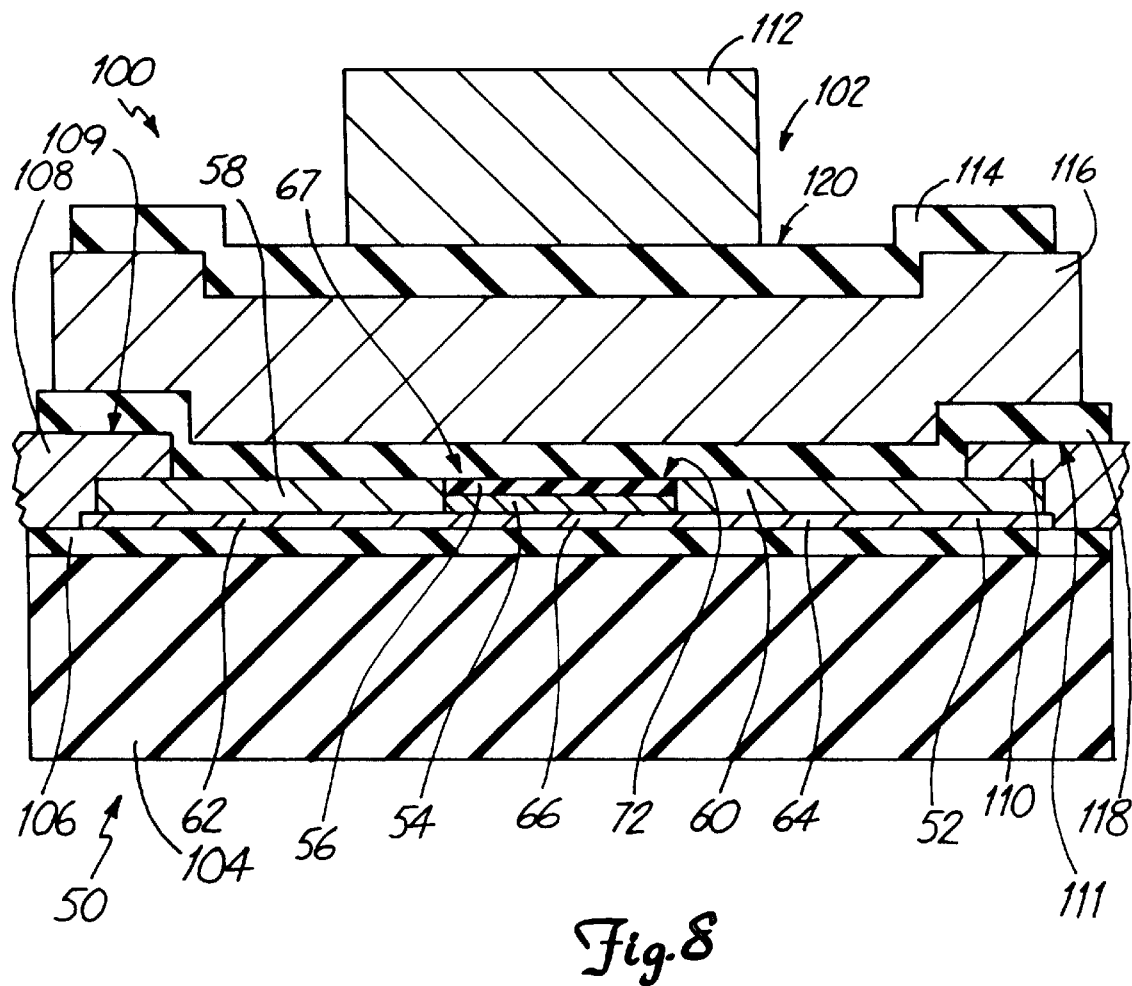
FIG. 8 is a sectional view of a magnetic head having an inductive write head fabricated on top an MR sensor in accordance with the present invention.

FIG. 8 illustrates a magnetic device which has an inductive write head or transducer fabricated on top of reader gap 118 of MR sensor 50. FIG. 8 is a sectional view of magnetic device 100 which includes inductive write head 102 and MR read sensor 50. MR sensor 50 is substantially the same as described with reference to FIG. 1. MR sensor 50 is shown fabricated on top of shield layer 104 and insulating layer 106. Conductors or contacts 108 and 110 have been added to MR sensor 50 for connecting MR sensor 50 to bond pads and external circuitry. Write head 102 includes top pole layer 112, write gap layer 114 and shared pole layer 116. Layers 106 and 118 are referred to as reader "half-gaps."

As can be seen in FIG. 8, conductors 108 and 110 are positioned on top of permanent magnet regions 58 and 60, MR element outer regions 62 and 64, and gap layer 106. Conductors 108 and 110 are regions of a conductor layer which is typically between 1000 Å and 5000 Å thick. As shown in FIG. 2, the placement of conductors 108 and 110 is away from the active region or central portion of MR sensor 50 which allows the sensor to maintain substantially planar surface 72 on which gap layer 118 and subsequent layers of write head 102 can be deposited. Because permanent magnet regions 58 and 60 help to define active region 66 of MR magnetic layer 52, conductors 108 and 110 need not be deposited near the central portion of MR sensor 50.

The planarity of surface 72 allows the central portion of layer 118 to be formed upon an essentially flat surface. This correspondingly allows the central portions of shared pole 116 and write gap layer 114 to be formed upon essentially flat surfaces, so that top pole 112 can be formed on a truly flat surface. Shared pole 116 is now flat at the edges of the track, as opposed to rising over the contacts at the edge of the track as in previous designs. This results in improved side reading characteristics.

Figure 9:
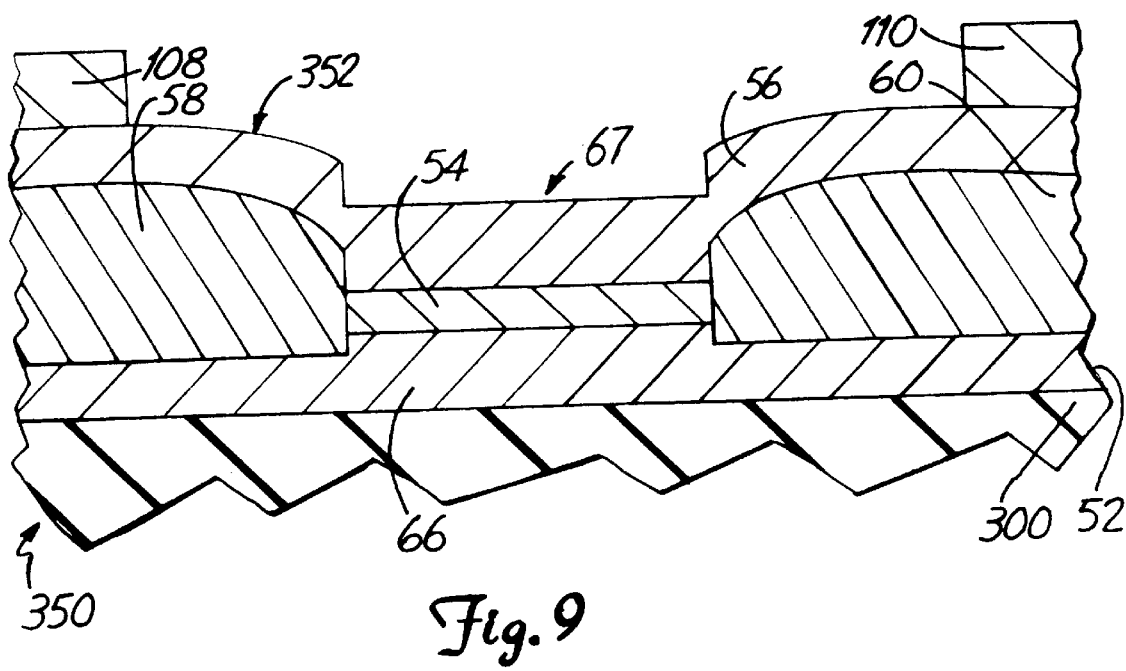
FIG. 9 is a sectional view of an alternate embodiment of an MR sensor in accordance with the present invention.

FIG. 9 is a sectional view of an alternate embodiment of MR sensor 350 in accordance with the present invention. As can be seen from FIG. 9, several features of MR sensor 350 are identical to MR sensor 100 of FIG. 8. However, SAL 56 shown in FIG. 9 has been expanded to be positioned on top of both spacer layer 54 and permanent magnet layer regions 58 and 60. In addition, it is noted that magnetic layer 52 and SAL layer 56 can be positioned interchangeably, as long as spacer layer 54 is positioned between the two.

The preceding discussion discloses the present invention which is a magnetic sensor having a properly biased MR magnetic layer due to the magnetic and resistive properties of a SAL. The present sensor also provides for a high resistivity in the SAL and the spacer layer, thereby maximizing the amount of sensed current which flows through the MR magnetic layer of the MR sensor, and also reduces the output voltage shunting, which in turn maximizes the output voltage of the sensor. Thus, the present invention provides an MR sensor which can optimally read information from a magnetic storage medium.

Although the present invention has been described with reference to preferred embodiments, workers skilled in the art will recognize that changes may be made in form and detail without departing from the spirit and scope of the invention.

What is claimed is:

1. A magnetoresistive sensor for detecting stored information from a medium and for providing an output voltage to auxiliary circuitry, the magnetoresistive sensor comprising:

a magnetoresistive magnetic layer having a magnetization property, a resistivity and a thickness, wherein a resistance of the magnetic layer equals the resistivity divided by the thickness, and wherein the output voltage is provided when a sense current flows through the magnetic layer;

a bias layer formed from a Sendust alloy of at least iron, silicon, and aluminum, comprising 70 to 90 percent iron, up to 15 percent silicon, and up to 15 percent aluminum, the Sendust alloy having a resistivity, a thickness and a saturation inductance, wherein a resistance of the bias layer equals the resistivity divided by the thickness, and where the resistance of the bias layer is in parallel with the resistance of the magnetic layer; the bias layer helping to bias the magnetization property of the magnetic layer from a rest position to a magnetized position when the sense current flows through the magnetic layer; and a spacer layer positioned between the magnetic layer and the bias layer, the spacer layer having a resistivity and a thickness, wherein a resistance of the spacer layer equals the resistivity divided by the thickness, and wherein the resistance in the spacer layer is in parallel with the resistances of both the magnetic layer and the bias layer.

2. The magnetoresistive sensor of claim 1 wherein the magnetic layer is formed from a combination of nickel and iron.

3. The magnetoresistive sensor of claim 1 wherein the magnetic layer has a thickness in the range of 25 to 400 angstroms.

4. The magnetoresistive sensor of claim 1 wherein the magnetic layer has a resistivity of less than 100 micro-ohm centimeters.

5. The magnetoresistive sensor of claim 1 wherein the bias layer has a thickness in the range of 25 to 1000 angstroms.

6. The magnetoresistive sensor of claim 1 wherein the bias layer has a resistivity of at least 100 micro-ohm centimeters.

7. The magnetoresistive sensor of claim 1 wherein the Sendust alloy is formed having up to 5% titanium.

8. The magnetoresistive sensor of claim 1 wherin the Sendust alloy is formed having up to 5% chromium.

9. The magnetoresistive sensor of claim 1 wherein the Sendust alloy is formed having up to 5% vanadium.

10. The magnetoresistive sensor of claim 1 wherein the Sendust alloy is formed having up to 5% manganese.

11. The magnetoresistive sensor of claim 1 wherein the Sendust alloy is formed having up to 5% zirconium.

12. The magnetoresistive sensor of claim 1 wherein the bias layer is formed in a sputtering argon gas.

13. The magnetoresistive sensor of claim 1 wherein the bias layer is formed in a sputtering neon gas.

14. The magnetoresistive sensor of claim 1 wherein the bias layer is formed in a sputtering krypton gas.

15. The magnetoresistive sensor of claim 1 wherein the bias layer is formed in a sputtering xenon gas.

16. The magnetoresistive sensor of claim 1 wherein the bias layer is formed in a sputtering radon gas.

17. The magnetoresistive sensor of claim 1 wherein the bias layer is formed in a sputtering helium gas.

18. The magnetoresistive sensor of claim 1 wherein a product of a saturation inductance of the bias layer times a resistivity of the bias layer is at least 1,000 Kilo Gauss-micro-ohm centimeters.

* * * * *